Sept. 27, 1966 L. SPENCER 3,275,036
SLIDING HANDLE MIXING VALVE
Filed Oct. 7, 1965 3 Sheets-Sheet 1

INVENTOR.
Lloyd Spencer

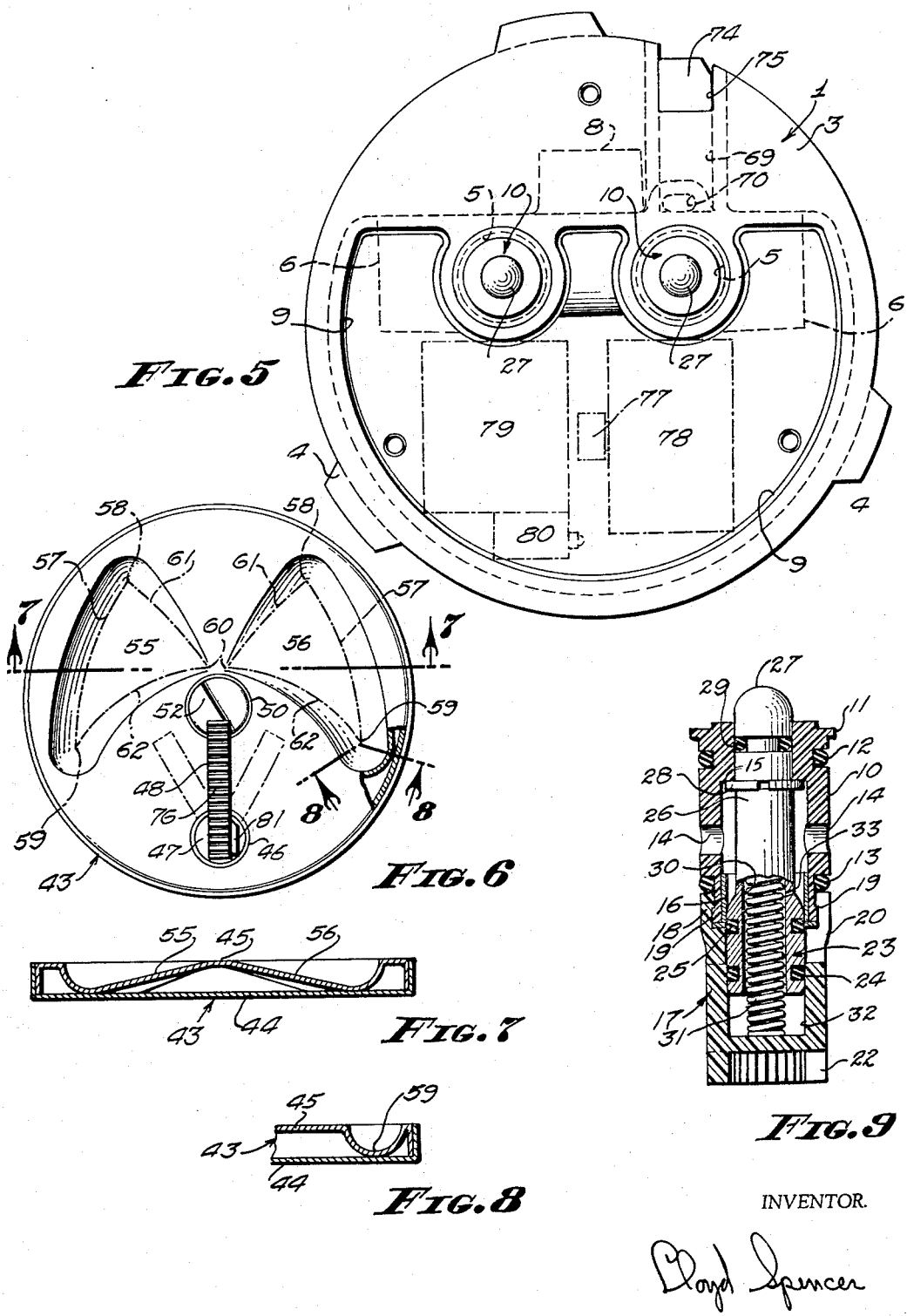

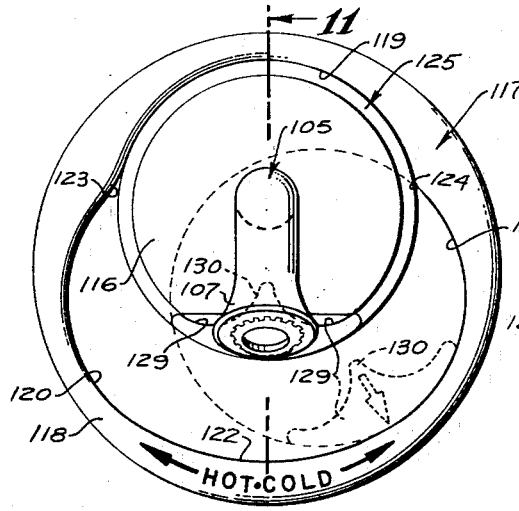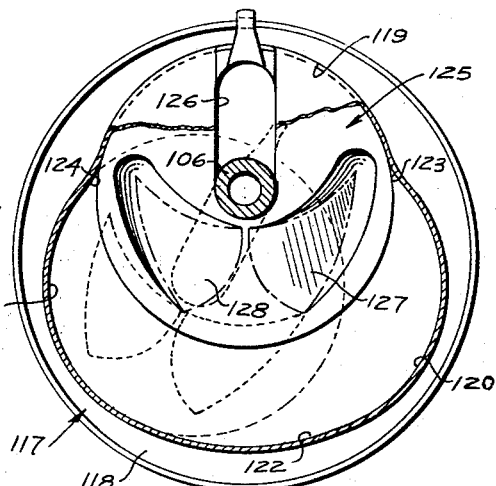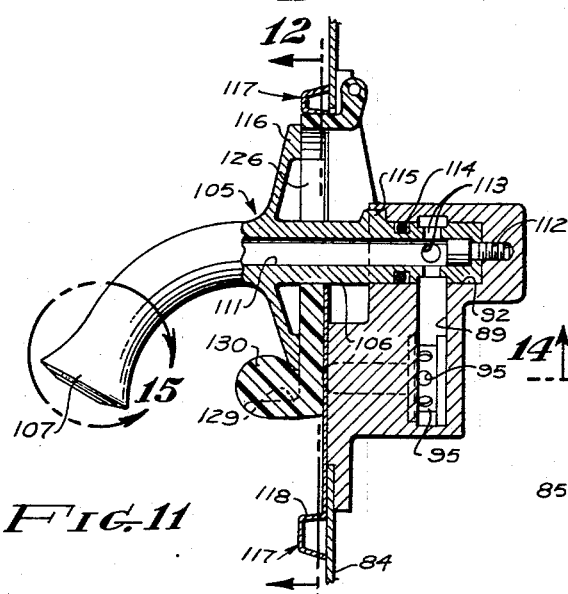

United States Patent Office
3,275,036
Patented Sept. 27, 1966

3,275,036
SLIDING HANDLE MIXING VALVE
Lloyd Spencer, 220 Patrician Way, Pasadena, Calif.
Filed Oct. 7, 1965, Ser. No. 498,198
15 Claims. (Cl. 137—636.1)

This invention relates to sliding handle mixing valves and is a continuation-in-part of my previously filed application, Serial No. 289,807 filed June 24, 1963, now abandoned, for Sliding Handle Mixing Valve.

Included in the objects of this invention are:

First, to provide a sliding handle mixing valve which utilizes a novel cam disk adapted for limited translational and pivotal movement on a plane surface within a surrounding stop rim, the cam disk having similar cam areas which are engaged by a pair of cam followers adapted to cause a pair of valves to open and close individually, in unison, or in opposition.

Second, to provide a sliding handle mixing valve which is particularly adapted to be wall mounted, and which, when so mounted, projects a minimum distance therefrom.

Third, to provide a mixing valve, one embodiment of which incorporates a novel locking means responsive to line pressure whereby the exposed parts of the mixing valve are secured against removal unless the line pressure to the valve is relieved but which automatically unlocks on relief of line pressure so that the mixing valve may be readily serviced.

Fourth, to provide a mixing valve which incorporates a timing means whereby, irrespective of the setting of the mixing valve, the valve is caused to shut off after a predetermined interval.

Fifth, to provide a mixing valve which includes a concealed auxiliary shutoff means whereby the valve may be closed irrespective of the setting of the mixing valve, the auxiliary shutoff means being adapted for individual time delay control or a group of mixing valves, such as may be installed in a gymnasium and may be shut off simultaneously, either manually or by remote control.

Sixth, to provide a sliding handle mixing valve, one embodiment of which is so arranged that a shower head extends from the valve control cam so that the shower head and valve may be installed as a single unit.

Seventh, to provide a mixing valve which is vandalproof and which is particularly adapted for installation in gymnasiums or prisons.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 5 is a front view of the valve housing.

FIGURE 6 is a back view of the cam disk, indicating by broken lines the boundaries of the cam areas.

FIGURE 7 is a transverse sectional view through 7—7 of FIGURE 6.

FIGURE 8 is a fragmentary sectional view taken through 8—8 of FIGURE 6.

FIGURE 9 is an enlarged longitudinal sectional view of one form of valve unit adapted for use in the sliding handle mixing valve.

FIGURE 10 is a front view of a modified form of the sliding handle mixing valve in which the valve surrounds the shower head and forms a single unit therewith, the control cam being shown in its closed position by solid lines, and the cold water valve unit in its fully open position by dotted lines.

FIGURE 11 is a vertical sectional view thereof taken through 11—11 of FIGURE 10.

FIGURE 12 is a sectional view thereof taken substantially through 12—12 of FIGURE 11, showing the back or operating side of the cam disk, the cam disk being shown by solid lines in its closed position and by dotted lines with the cold water valve unit in its fully open position.

FIGURE 13 is a front view of the valve body with the covering members removed.

FIGURE 14 is an enlarged sectional view taken through 14—14 of FIGURE 13, showing a valve unit suited to the construction shown in FIGURES 10 and 11.

FIGURE 15 is an enlarged sectional view of the shower tip taken within circle 15 of FIGURE 10.

Figure 1:
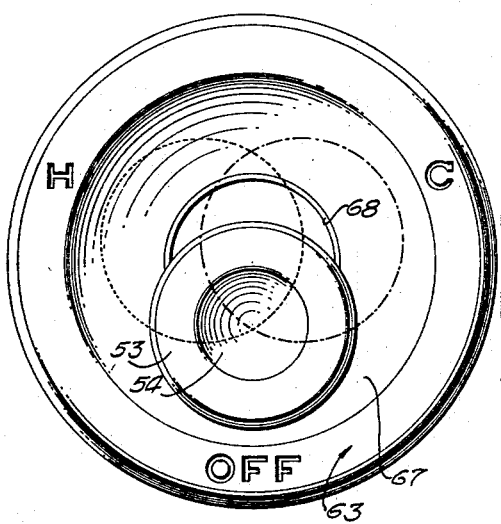
FIGURE 1 is a front view of one embodiment of the sliding handle mixing valve, indicating by solid lines the position of the valve handle corresponding to the closed positions of both the hot and cold water valve units and indicating by dotted and broken lines the positions of the handle corresponding, respectively, to the full open positions of the hot and the cold water valve units.

Reference is first directed to FIGURES 1 through 9. The mixing valve includes a valve body structure 1 adapted to be set in a wall panel 2. The body structure is provided with a circular mounting flange 3, the margins of which overlie the margins of an opening in the wall panel. Several, such as three, retainer lugs 4 project radially from the mounting flange.

The body structure is provided with a pair of valve sockets 5 extending rearwardly from the mounting flange 3 and located in a common horizontal plane slightly above the center of the mounting flange. Inlets 6 communicate with the valve sockets at their inward ends. Intermediate their ends, the valve sockets are intersected by a mixing chamber 7 disposed between the valve sockets and communicating with an outlet 8. Below the sockets, the valve body is provided with a relatively large cavity 9 which may receive a timing mechanism, to be described hereinafter.

Each valve socket 5 receives a valve unit shown best in FIGURE 9, which includes a tubular liner 10 having a flange 11 adjacent its outer end for retention in its valve socket. The liner is provided with outer and inner O-rings 12 and 13 which sealingly engage the valve socket on either side of its communication with the mixing chamber. Outlet ports 14 are located between the O-rings 12 and 13. Near its outer end, the bore of the liner is provided with a shoulder 15, and its inner end receives a valve seat sleeve 16.

Fitted on the inner end of the line 10 is a pressure equalizer cap 17 having a ring of fingers 18 at its forward end. The inner end of the liner and the extended ends of the fingers have interlocking shoulders 19 so that the cap 17 may be snapped in place. Inlet slots 20 are formed between the fingers 18. The cap 17 is dimensioned to form with the walls of its valve socket 5 an annular flow passage 21, and strainer slots 22 are provided at the inner end of the cap.

The pressure equalizer cap 17 receives a piston 23 having an inner O-ring 24 and an outer O-ring 25. The O-ring 25 engages the valve seat sleeve 16 and forms therewith a flow control valve. A stem 26 extends forwardly from the piston and terminates in a cam follower tip 27. The stem is provided with a stop ring 28 which engages the shoulder 15 when the O-ring 25 is in sealing engagement with the valve seat sleeve 16. The stem is provided with an O-ring 29 disposed forwardly of the stop ring 28.

The piston 23 and its stem 26 are provided with a socket 30 which receives a spring 31 to urge the plunger forwardly or outwardly into sealing engagement between the O-ring 25 and its seat 16. The cap 17 forms with the piston 23 an equalizer chamber 32 which is in communication with the region downstream of the piston by an equalizer port 33.

A cover plate 34 overlies the mounting flange 3 and is secured thereto by screws 35. The cover plate is provided with a marginal rim 36 of essentially "clover leaf" shape; that is, the rim is provided with a semicircular bottom lobe 37 and side lobes 38 and 39, connected by an arch portion 40; whereas radially inwardly protruding shoulders 41 and 42 are formed between the bottom lobe 37 and each of the lobes 38 and 39.

Received within the rim 36 is a circular cam disk structure 43 comprising an inner disk 44 and an outer disk 45 having overlapping cylindrical walls suitably bonded together. Near its lower margin the cam disk structure is provided with a pivot pin sleeve 46 which receives a pivot pin 47 joined to a slide bar 48 which is adapted to move vertically in a slot 49 formed in the cover plate 34 midway between and below the valve sockets 5.

At its center, the cam disk structure 43 is provided with a journal sleeve 50 which receives a handle stem 51 and retainer screw 52. A handle 53 extends outwardly from the stem 51. The handle may be in the form of a knob, preferably with a central socket 54 which facilitates manipulation of the handle or knob.

The cam disk structure is free to move within the confines of the stop rim 36; however, in order to move into the lobes 38 and 39, the cam disk structure must pivot about the axis of the pivot pin as it rolls over the shoulders 41 and 42. Movement of the cam disk structure within the boundaries of the stop rim causes the points defined by the cam engaging tips 27 of the valve units to describe essentially triangular figures, which are contoured to form cam areas 55 and 56.

Corresponding sides 57 of the cam areas and the extremities thereof forming apexes 58 and 59 are of uniform major depth to permit the valve units to occupy their closed positions. The apexes 60 opposite from the sides 57 are contiguous to each other and are of minimum depth, so that, when occupied, they cause the corresponding valve unit to occupy its fully open position. The sides 61 joining apexes 58 and 60, and the sides 62 joining apexes 59 and 60 and the area therebetween slope in a predetermined manner to open the valve units the desired amount for a selected position of the cam disk structure.

The cam disk structure 43, cover plate 34 and mounting flange 3 are covered by an escutcheon or retainer member 63 having a peripheral wall 64 and inturned flange 65. Slots 66 are formed in the flange 65 to accommodate the lugs 4, so that the escutcheon member may be slipped over the mounting flange and then turned a few degrees for interengagement of the flange 65 and lugs 4.

The escutcheon member is provided with an apertured central depressed area 67, the aperture of which is bordered by a bearing ring or bushing 68 of such dimension as to clear the handle stem 51. The relative proportions of the cam disk structure and the opening formed by the bushing 68 is such that the periphery of the cam disk structure is not exposed when in its extreme positions determined by the stop rim 36, so that the bearing ring 68 holds the cam disk structure against the surfaces of the cover plate 34.

Figure 2:
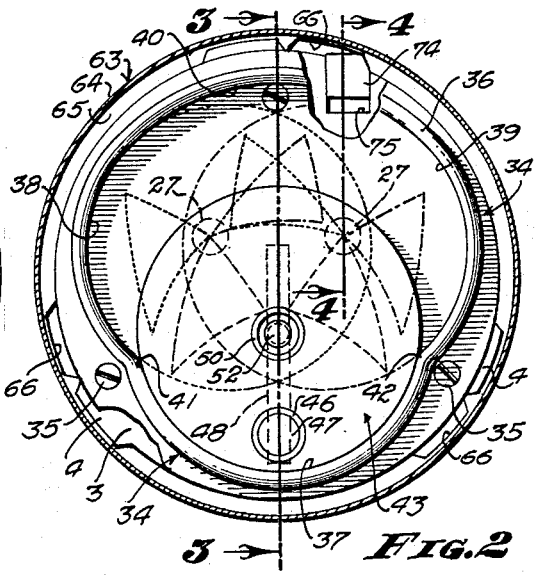
FIGURE 2 is a sectional view taken substantially through 2—2 of FIGURE 3, showing by solid lines the off position of the operating cam disk and showing by dotted lines and broken lines the ranges of movement of the cam disk to effect control of the hot and cold water valve units.
Figures 3, 4:
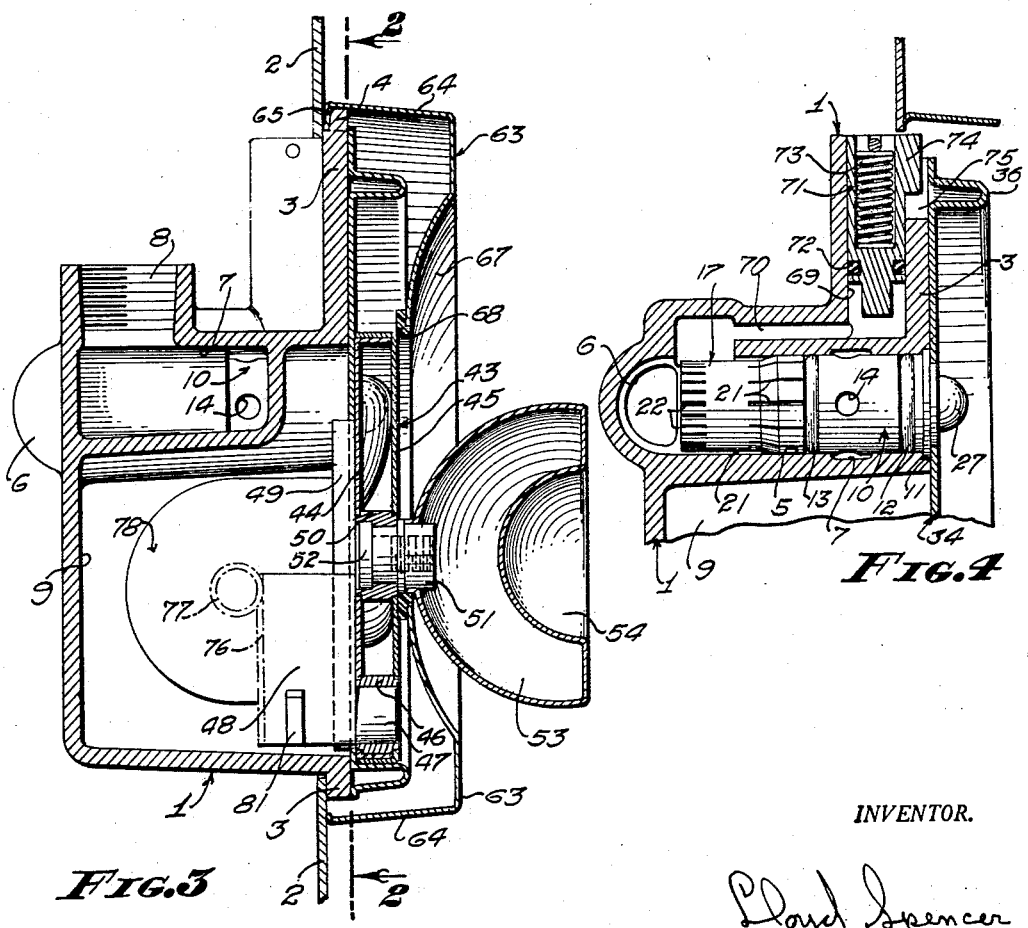
FIGURE 3 is an enlarged, vertical sectional view taken through 3—3 of FIGURE 2.
FIGURE 4 is a fragmentary sectional view taken through 4—4 of FIGURE 2 showing one of the valve units and the pressure-operated latching means.

In order to prevent removal of the escutcheon member when pressure exists at the inlet side of the mixing valve, the valve body is provided with a radial latch piston bore 69, contiguous to the mounting flange 3 and connected by a passage 70 with the cold water inlet, as shown best in FIGURE 4. The passage 70 receives a piston 71 having an O-ring 72. Water pressure urges the piston radially outward, whereas a spring 73 urges the piston radially inwardly. The outer end of the piston is provided with a latching lug 74, which rides in a slot 75 provided in the mounting flange 3. The latching lug 74 is so located that, when the escutcheon member 63 is secured to the mounting flange 3, it enters one of the slots 66 provided in the inturned flange 65 of the escutcheon member 63 to prevent removal of the escutcheon member, as shown in FIGURE 2.

It will be noted that, irrespective of the movement of the cam disk structure, the slide bar 48 moves in a vertical direction; thus, vertically downward movement of the slide bar will move the cam disk structure in a direction to close either or both valve units. This movement is utilized to provide a timing means for the mixing valve.

The back side of the slide bar 48 is provided with rack teeth which engage a pinion gear 77 of a rotary solenoid 78 fastened to the back of the cover plate 34 and received in the cavity 9. Also mounted on the back side of the cover plate is a conventional electric time delay unit 79 and a switch 80. A switch cam 81 at one side of the slide bar 48 engages the switch 80 immediately on upward movement of the slide bar to initiate a predetermined timing cycle.

Operation of the sliding handle mixing valve shown in FIGURES 1 and through 9 is as follows:

When the cam disk structure 43 is in its lower position shown in FIGURES 2 and 3, the cam follower tips 27 of the two valve units occupy the apexes 58 of the cam areas 55 and 56. When the cam disk structure is moved, while maintained in engagement with the stop rim 36, upwardly and to the right as viewed in FIGURES 1 and 2, the right hand or cold water valve unit is caused to open by reason of movement of its cam follower tip 27 along the side 62 of the cam area 55, while the cam follower tip left hand or hot water valve unit is caused to trace the side 57 of the cam area 56 and remain in its off position. Similarly, movement of the cam disk structure 43 upwardly and to the left causes the hot water valve unit to open and the cold water valve unit to remain closed. Lateral, or left and right, movement of the cam disk structure causes one valve unit to open and the other to close.

The timing mechanism may be set into operation by a predetermined initial movement, so that thereafter, irrespective of the position to which the respective valve units are set, the timing mechanism, after a predetermined interval, will shut off either or both valve units. Unless the solenoid is energized, it is free to turn, so that the mixing valve may be manually shut off or the flow reduced prior to operation of the timing mechanism.

Reference is now directed to FIGURES 10 through 15. The mixing valve here illustrated is particularly adapted for multiple installations such as in shower rooms of gymnasiums, barracks, or prisons. The shower head and valve form a single unit to simplify installation, and is so constructed as to be vandal-proof.

The mixing valve includes a valve body 82 adapted to be set in a circular opening 83 provided in a wall panel 84. The valve body 82 includes a partial flange 85 and a pair of fingers 86 at its forward and upper side, so that the valve body may be slipped through the opening 83 and secured to the back side thereof by screws 87.

The valve body 82 includes a pair of parallel bores 88 which are screw-threaded and intersect a common mixing chamber 89. Inwardly from the mixing chamber 89, the valve body is provided with inlet bores 90 which terminate in internally screw-threaded inlet sockets 91. The mixing chamber 89 extends upwardly and intersects an outlet bore 92.

Each of the bores 88 receives a valve unit 93, which includes a spacer 94 flanged at its axial extremities and provided with ports 95. The axially inner end of the spacer 94 is fitted with a valve seat member 96 and a disk 97. The axially outer end of the spacer receives a diaphragm 98 having a central aperture. A valve armature 99 including a head 100 having a stem 101 and a sleeve 102 having a cam follower end 103 clamps the diaphragm 98. The valve unit 93 is more fully described in my copending application, Serial No. 359,392, filed April 13, 1964, and entitled Replaceable Valve Unit. The valve units 93 are clamped and sealed in place by screw-threaded sleeves 104.

A shower head unit 105 is provided with a stem 106 which fits the outlet bore 92. The outer end of the shower head unit 105 curves downwardly and terminates in a shower head 107 having a flared extremity. The extremity of the shower head 107 is internally screw threaded to receive a spray plug 108 having a serrated periphery so that the water discharges in a conical spray. The plug 108 is provided with an Allen type socket 109, which is covered by vandal resisting disk 110 which must be drilled out in order to remove the plug 108. Internally, the shower head unit is provided with a flow passage 111. The inner end of the stem 106 receives a bolt 112 for securing the shower head unit in place. Access to the bolt is provided by use of an Allen wrench, not shown, secured to a stiff spring, also omitted, so that it may be inserted in the flow passage 111 and forceably rotated. The stem 106 is provided with a channel having ports 113 which communicate with the mixing chamber 89. An O-ring 114 seals the stem 106 in the outlet bore 92. Also, a lug 115 is provided so as to orient the shower head unit. Outwardly from the valve body 82, the shower head unit 105 is provided with a cam retainer flange 116.

The wall panel opening 83 and the valve body 82 are covered by an escutcheon plate 117 which combines the functions of the cover plate 34 and escutcheon plate 63 of the first-described structure. That is, the plate 117 is provided with a stop rim 118 which includes a semicircular top lobe 119 and side lobes 120 and 121 connected by a lower arched portion 122, and radially inwardly protruding shoulders 123 and 124 are formed between the top lobe 119 and each of the lobes 120 and 121.

Interposed between the retainer flange 116 and the plate is a cam disk 125 corresponding to the cam disk 43 of the first described structure. The cam disk 125 is provided with a slot 126 which receives the stem 106 of the shower head unit 105. The cam disk 125 is free to move within the confines of the lobed stop rim 118; however, in order to move into the lobes 120 and 121, the slot 126 of the cam disk must pivot about the axis of the stem 106 in a manner analogous to the pivotal movement of the cam disk 43 about the pivot pin 52. Such movement of the cam disk 125 within the confines of the stop rim 118 causes the cam engaging or cam follower ends 103 of the valve armatures 99 to describe essentially triangular figures which are contoured to form cam areas 127 and 128, corresponding to the cam areas 55 and 56 of the first described structure. It should be noted that the valve units 93 close against water pressure, whereas the valve units of the first described structure close with water pressure, and the cam areas 127 and 128 differ accordingly from the cam areas 55 and 56.

The cam disk 125 is slightly larger than the retainer flange 116, and the lower side of the retainer flange 116 is cut away to expose a segment of the cam disk. The lower margin of the exposed segment is extended forwardly to form a pair of finger grooves 129 separated by a web 130, which together constitute a handle.

Operation of the mixing valve structure shown in FIGURES 10 through 15 is as follows:

When the cam disk 125 is in its upper position, both hot and cold valve units are closed. Downward pull on the finger grooves 129 opens either or both valve units. By pulling downward and to the left, as indicated by dotted lines in FIGURE 10, the cold water valve unit is opened. A downward pull to the right opens the hot water valve unit. Sidewise movement regulates the temperature by opening one valve unit and closing the other.

Both mixing valves herein described are particularly suited for use in shower rooms where a large number of shower units may be installed. In the construction shown in FIGURES 10 through 15, the cam disk is provided with an inwardly extending lug terminating in an upwardly directed eyelet 131 which is connected in concert with other valves to a cable system, not shown, so that all of a group of valves may be manually closed or closed by remote control means. If individual control is desired, means similar to that shown in connection with the first-described structure may be located above each valve structure.

If the back side of the valve body 82 is accessible, the bolt 112 may extend forwardly from the back side of the valve body, so as to minimize the possibility of vandalism.

Although particular embodiments of the invention have been shown and described, the invention is not limited thereto but includes the constructions, combinations and arrangements embraced in the appended claims.

I claim:
1. A mixing valve, comprising:
  (a) a pair of parallel valve units having cam follower elements for opening and closing said valve units;
  (b) a cam structure movable in a predetermined plane traversing said cam follower elements; and
  (c) means limiting said cam structure to an essentially triangular path in said plane, whereby said cam follower elements describe corresponding triangular paths on said cam structure, the areas within said paths on said cam structure forming cam areas contoured to effect movement of said cam follower elements individually, in unison, or in opposition thereby to cause corresponding opening and closing of said valve units.

2. A mixing valve as set forth in claim 1, wherein said mixing valve further includes:
  (a) a timing means, initiated by movement of said cam structure from a position in which both valve units are in their closed position, for engaging said cam structure to return, after a predetermined interval, said cam structure to said position.

3. A mixing valve as set forth in claim 1, wherein said mixing valve further includes:
  (a) handle means in front of said cam structure for manipulating said cam structure; and
  (b) other means operably connected with the back side of said cam structure for moving said cam structure to a position wherein both of said valve units are closed.

4. A mixing valve as set forth in claim 1, wherein said mixing valve further includes:
  (a) a shower head structure having a stem projecting through said cam structure and said stem is incorporated in said means for limiting movement of said cam structure.

5. A mixing valve, comprising:
  (a) a valve body structure having parallel bores to receive valve units, inlets for said bores, and a common outlet therefrom;
  (b) means defining a plane traversing said bores and bounded by a three-lobed wall;
  (c) valve units in said bores including cam follower elements protruding through said plane for opening and closing said valve units;
  (d) a cam disk movable on said means into the lobes of said wall;
  (e) co-operating guide slot and pivot means incorporating said cam disk for limiting rotation of said cam disk about an axis perpendicular to said plane defining means; and
  (f) said cam disk movable on said plane defining means into the lobes of said wall to describe an essentially triangular path, whereby said cam follower elements describe corresponding triangular paths on said cam disk, the areas within said paths on said cam disk forming cam areas contoured to effect movement of said cam follower elements individually, in unison, or in opposition, thereby to cause corresponding opening and closing of said valve units.

6. A mixing valve as set forth in claim 5, wherein said mixing valve further includes:
 (a) a timing means initiated by movement of said cam disk from a position in which both of said valve units are in their closed position and engageable with said pivot means to return said cam disk to said position after a predetermined interval.

7. A mixing valve as set forth in claim 5, wherein said mixing valve further includes:
 (a) handle means in front of said cam structure for manipulating said cam structure; and
 (b) other means operably connected with the back side of said cam structure for moving said cam structure to a position wherein both of said valve units are closed.

8. A mixing valve as set forth in claim 5, wherein said mixing valve further includes:
 (a) a retainer member for maintaining said cam disk in a predetermined plane;
 (b) interengaging elements incorporated in said valve body structure and said retainer member, said valve body structure and said retainer member being relatively rotatable to cause interengagement and disengagement of said elements; and
 (c) locking means, responsive to fluid pressure at an inlet of said valve body structure, operative to secure said elements in their interengaging positions.

9. A mixing valve as set forth in claim 5, wherein:
 (a) said guide slot is formed in said cam disk; and
 (b) said pivot means is a shower outlet stem extending through said cam disk.

10. A mixing valve, comprising:
 (a) a valve body structure having parallel bores to receive valve units, inlets for said bores, and a common outlet therefrom;
 (b) a cam structure overlying said cam follower elements;
 (c) means including a retainer member for restricting said cam structure to movement in a predetermined plane; and
 (d) means limiting said cam structure to an essentially triangular path within said plane, whereby said cam follower elements describe corresponding triangular paths on said cam structure, the areas within said paths on said cam structure forming cam areas contoured to effect movement of said cam follower elements individually, in unison, or in opposition, thereby to cause corresponding opening and closing of said valve units.

11. A mixing valve as set forth in claim 10, wherein said mixing valve further includes;
 (a) a timing means, initiated by movement of said cam structure from a position in which both valve units are in their closed position, for engaging said cam structure, after a predetermined interval, to return said cam structure to said position.

12. A mixing valve as set forth in claim 10, wherein said mixing valve further includes:
 (a) handle means in front of said cam structure for manipulating said cam structure; and
 (b) other means operably connected with the back side of said cam structure for moving said cam structure to a position wherein both of said valve units are closed.

13. A mixing valve as set forth in claim 10, wherein:
 (a) said valve body structure and retainer member incorporate separable interengaging elements relatively rotatable between interengaging and disengaging positions; and
 (b) locking means, responsive to pressure at an inlet of said valve body structure, is operative to secure said elements in their interengaging positions.

14. A mixing valve as set forth in claim 10, wherein said mixing valve further comprises:
 (a) a shower head structure incorporating said retainer means and including a valve stem extending through said cam structure, the cam structure having an accommodation slot therefor.

15. A mixing valve comprising:
 (a) a pair of parallel valve units having cam follower elements for opening and closing said valve units;
 (b) a tubular stem extending forwardly from said valve units and communicating therewith to form a common outlet therefor;
 (c) a cam disk including a slot for receiving said stem;
 (d) walls surrounding said cam disk limiting movement of said cam disk about said stem, said walls being shaped to cause said cam follower elements to describe corresponding, essentially triangular paths on said cam disk as said cam disk is moved within the confines of said walls, the areas within said paths forming cam areas contoured to effect movement of said cam follower elements individually, in unison, or in opposition, thereby to cause corresponding opening and closing of said valve units; and
 (e) a handle for said cam disk disposed at one side of said stem for manipulating said cam.

References Cited by the Examiner
UNITED STATES PATENTS

| | | | |
|---|---|---|---|
| 2,409,765 | 10/1946 | Kehle | 137—636 |
| 2,566,860 | 9/1951 | Segal | 137—636 |
| 2,653,628 | 9/1953 | Spencer | 137—636 |
| 2,871,883 | 2/1959 | Dunlap | 137—624.12 |

WILLIAM F. O'DEA, *Primary Examiner.*

D. MATTHEWS, *Examiner.*